STEAM

TO RECEIVING ZONE

United States Patent Office 3,411,925
Patented Nov. 19, 1968

3,411,925
OXIDIZED STARCH-PROTEIN COMPOSITION AND METHODS FOR PRODUCING AND USING THE SAME
George E. Lauterbach, Neenah, Wis., assignor to Kimberly-Clark Corporation, Neenah, Wis., a corporation of Delaware
Continuation-in-part of application Ser. No. 291,825, July 1, 1963. This application Mar. 24, 1966, Ser. No. 543,446
11 Claims. (Cl. 106—157)

This application is a continuation-in-part of my copending application Ser. No. 291,825 filed July 1, 1963, now abandoned and assigned to the same assignee.

This invention relates to the production of a starch-protein product having various utilities, and to paper coating compositions and coated paper which include such products as a binder.

This application is related to my co-pending application Ser. No. 116,734 filed June 13, 1961, now Patent No. 3,211,564, and assigned to the same assignee as the present invention. In that application I have described the substantially continuous coordinated production of a coating composition by means which included effecting controlled cooking and modification of raw or common starch at temperatures well above the gelatinization range of the starch in the presence of an oxidizing agent which is consumed in the process. I have now found that, when protein is incorporated with the common starch and oxidizing agent under alkaline conditions, a beneficial product is attained which is particularly useful in coating compositions for paper.

For convenience of illustration the invention is specifically described in connection with the formulation and use of the starch-protein product as a binder in aqueous emulsion mineral containing coating compositions for light basis weight printing papers.

It has been suggested to produce coated printing papers with aqueous emulsion coating systems. Such systems have included in the dispersion phase an oil which volatilizes at a higher temperature than the water of the emulsion. The dried coating exhibits a multiplicity of voids created by the vaporization of oil in drying which voids contribute to the opacity of the coated paper. Primary difficulties with such systems have been the expensive nature of the binder component, the tendency of the completed coating to be tacky to the touch and for letterpress printing paper the necessity of a high pick resistance.

A primary object of the invention is to provide a novel starch-protein fluid composition.

A principal object of this invention is to provide an aqueous coating composition emulsion which contains a significant quantity of pigment and employs a binder material which is economical and is formulated principally from native or common starch and protein subjected to an oxidizing action in the presence of each other.

Another object of the invention is to provide a coated printing paper which is of improved resistance to the development of tack when exposed to the touch of a finger, for example.

A particular object of the invention is to provide a novel method of producing a starch-protein product having utility as an adhesive and which method involves subjecting the common starch and protein to an oxidation reaction in an aqueous slurry of the protein and starch.

An important object of the invention is to provide a starch-protein product useful as a binder and which may be derived from common flours containing starch and protein without addition of other starch or proteinaceous components.

In the preferred practice of the invention common starch preferably has incorporated therewith a small proportion by weight of a proteinaceous material, and the starch and protein are cooked and modified (oxidized) together. This cooking and modification takes place under pressure in a distinctly alkaline aqueous system with agitation at elevated temperatures (220°–350° F.) in the presence of a small quantity of an oxidizing agent which forms mainly carbonyl from the alcohol groups of starch. Although the reactions which take place during the cooking and modification are not completely understood and my invention is not predicated on any particular theory, a possible explanation of the factors involved is offered. Apparently the elevated temperatures and agitation cause the starch and protein to swell quickly and to disperse essentially molecularly and approach a true solution form. Under the influence of the alkaline and oxidizing agents which permeate the material, oxidizing the protein and starch, interaction between the protein and starch results. The interaction apparently achieves a branching of some of the molecules of the starch by grafting protein molecules thereto.

This interaction is not affected by the presence of other usual paper coating components of mineral paper coating compositions; the system interaction is, however, characterized by a high alkaline requirement for paper coating compositions during cooking and modification (oxidation)—much greater than is normally required to offset the acidic substances produced in the starch modification. The protein apparently undergoes hydrolysis as well as oxidation. This alkaline hydrolysis results in the production of acidic products which may be offset by the increased alkali added to the system. Also, the globular shape of the protein molecule is apparently changed to a more linear form.

Whatever be the explanation, I have found it essential to the practice of the invention that the cooking of the starch and protein together with the agent which forms the carbonyl groups from the alcohol groups of starch be effected rapidly at a temperature well above the gelatinization range of the starch. The starch used preferably is cornstarch, termed in the trade pearl starch, but may be potato, wheat, rice, or tapioca starch, for example. Also, the protein may take any number of convenient forms such as soy protein, casein and the like. A particular feature of the invention is that the common starch and protein may be included in one component such as sorghum or corn or wheat flour. In this application the term "common" starch is intended to include the thick boiling unmodified starches although in the industry reference is frequently made to all of such raw starches as "pearl" starch.

Most important to the production of a suitable paper coating composition is that the binder system have little tendency to gel upon cooling. Some starches, such as those which are substantially free of amylose as waxy corn, white sorghum and the like are adequate in this respect but are presently more expensive than the preferred native or common starches available on the open market. I have found that the gelling tendency of starches such as potato, tapioca, corn, wheat, rice and sorghum may be controlled adequately by the inclusion within the composition of soap to the extent of about 0.75% to 1.25% based on the dry binder weight. Particularly, it appears that the quantity of soap is relatively critical and optimum results are achieved at about 0.9% to 1% binder weight. The soap should be added to the extent that maximum thinning of the binder composition occurs. The soap is not necessarily added to the composition before cooking. It may be added to the hot material emanating from the cooker but should be added before cooling to prevent gelatin. Preferably, the soap is cooked with the starch and protein.

The oxidizing agent which is required to be added to the starch-protein composition in the cooker may be added to the extent of about 0.1% to 5% by weight of the binder. The quantity is selected so that the oxidizing agent is essentially completely exhausted during the reaction and the quantity is proportioned to the starch and protein to achieve a predetermined viscosity under the temperature conditions of the reaction. The oxidizing agent is further selected to be dispersible in an aqueous alkaline starch slurry and is required to be soluble in water to a considerable degree. Persulfuric acid and soluble salts thereof such as ammonium persulfate have been found to be particularly suitable, but other hydrolyzing agents such as the hypochlorites, peroxides, and others may be employed. The utility of the oxidizing agent varies somewhat depending upon the ultimate use of the starch-protein reaction product, as some agents cause color formation in the final composition. The amount of oxidizing agent required is small, having an insignificant effect on total solids of the composition and is, in fact, dependent upon the selected reaction temperature and the extent to which the modification of the starch and protein is desired for the particular coating composition solids. At higher temperatures less oxidizing agent is required to effect a given viscosity change in the common (raw) starch and protein.

The aqueous dispersion of the protein-starch-oxidizing agent is necessarily made distinctly alkaline for paper coating composition usage so that the final composition preferably has a pH in the range of 8 to 10. Any common alkali such as sodium hydroxide, sodium bicarbonate, sodium carbonate, sodium tripolyphosphate, tetrasodium pyrophosphate or the like serves the purpose.

The protein must, for my purposes, be cooked and oxidized with the common starch; separate cooking and oxidation of the protein and starch do not result in coating formulations of the same quality. Commonly, when starch and protein are simply cooked separately in the presence of an alkali, the viscosity of each dispersion is relatively high. When each is cooked in the presence of both an alkali and an oxidizing agent, the viscosity of each is much lower. Quite unexpectedly, I have found that by cooking and oxidizing the starch and protein together at a temperature in excess of the gelatinization range of the starch, the viscosity is materially higher than in the latter of the foregoing instances.

The cooking and oxidation of the common starch and protein may take place in equipment and under conditions as set forth in my co-pending application Ser. No. 116,734 filed June 13, 1961, now Patent No. 3,211,564. Thus, the cooking may most conveniently be effected in a jet cooker, or a Thermutator (a product of Cherry-Burrell Company, Cedar Rapids, Iowa), the latter being essentially a continuous autoclave. Such cookers provide for the cooking and oxidation actions and starch-protein interaction in a minimal time.

The temperature of cooking and modification must be above the gelation range of the starch employed. Temperatures of 220°–350° F. have been found most useful in effecting control of the process as to viscosity and completion of the oxidizing action on the starch and protein within a short period of time. Such temperatures are well above the gelatinization range of most common starches used in paper coating compositions, starches commonly having a gelatinaztion range between about 120°–175° F. The reaction time at these high temperatures (220°–350° F.) must be maintained short in order to obtain maximum control of the oxidation step by consumption of the oxidizing reagent under controlled conditions, and for this reason a continuous cooking and oxidizing process is preferred.

Necessary to the formation of an adequate paper coating composition whether it be a conventional composition or of the aqueous emulsion type is the inclusion of some pigment. Such is not a specific feature of the present invention but has been found to be highly desirable for effective drying of emulsion coating compositions and volatilization of the oil from the web. This pigment may be clay, calcium carbonate, titanium dioxide or the like, that is, any conventional aqueous paper coating composition pigment. However, clay is preferred for reasons of economy. The clay may itself be added to the aqueous starch-protein dispersion and cooked therewith, and this is desirable as it aids clay dispersion. However, if preferred, the clay may be added after the cooking and modification of the starch and protein. In the emulsion paper coating compositions, particularly for letterpress printing, the proportion of binder to pigment is somewhat greater than in conventional mineral pigment coating compositions wherein the pigment is customarily the dominant component on a weight basis.

In general, in paper coating compositions of an oil-in-water nature, the solids content of the total composition is in the range of about 25 to about 45%. For letterpress printing the ratio of binder to pigment or total solids as well as the binder to oil ratio are important factors in the production of an adequate coating. The following data are predicated on a dry basis with the protein content included as binder since it serves this function as well as that of emulsifying agent. Based on an oil having a specific gravity of 0.78, the binder to oil weight ratio is suitably between about 1:1 to 1:2.25, and the pigment to binder ratio from about 1:1 to about 1:1.4. The coating composition viscosity is preferably between about 3,000 to 18,000 centipoises, as measured on a Brookfield viscometer at 50° C. at 100 r.p.m. with a #6 or #7 spindle. Further, the protein in such oil-in-water systems preferably constitutes 5–10% of the total binder weight. For rotogravure printing paper the protein of the oil-in-water system may form a larger proportion of the binder. The oil content of itself is not critical to cell or void formation but the oil content does bear a relationship to the pigment and binder content in the production of numerous cells of adequate dimension for uniform light reflectance from the finished coated web. In general, the proportions of oil, pigment and binder, when employing the starch-protein product as a binder, are not in themselves a specific feature of this invention.

Oil addition for aqueous emulsion coating composition formulation may be with the starch-protein so that the oil passes through the cooker, or the oil may be added to the hot composition after cooking. In any event, it is desirable to add the oil while the composition is in a state of relatively low viscosity. Useful oils must be immiscible with water and include those such as kerosene, Stoddard solvent, xylene, Stanisol and the like having a higher boiling point than water at the coating composition drying temperature so that, upon drying of the coating, the primary portion of the oil is volatilized after the water has been essentially completely removed.

The invention will be more fully understood with respect to the following detailed illustrative examples and the accompanying drawings wherein.

Figure 3:
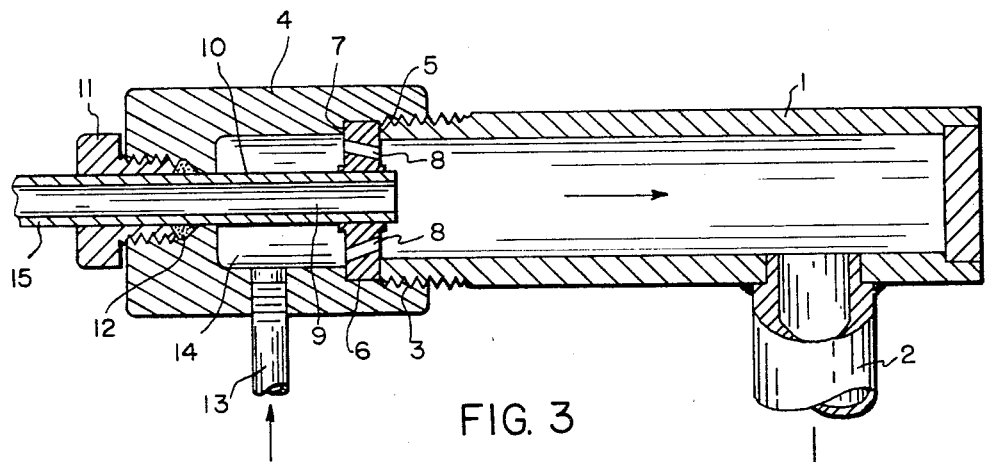
FIG. 3 is a view of an apparatus arrangement for effecting the process.

Referring first to FIG. 3 of the drawings, the numeral 1 designates a longitudinally extending mixing chamber having an outlet 2 at its rightward end. This chamber is preferably of stainless steel and of circular cross section. At its leftward extremity 3 the chamber 1 is threadedly received in a holder 4 which is adapted to retain an orifice plate 5 supported in a cavity 6 of the holder in abutment within an internal peripheral shoulder 7 of the holder. The plate 5 is itself provided with a plurality of peripherially disposed orifices 8 which angle and open toward the longitudinal axis of the mixing chamber. Plate 5 is supported at one extremity 9 of a longitudinally axially extending stainless steel conduit 10 of small diameter. At its rightward extremity 9 the conduit 10 opens axially into the mixing chamber 1. Leftwardly the holder 4 receives threadedly an adapter 11 which is axially bored at 12. Conduit 10 extends through the adapter. A steam inlet 13 extends throughout holder 4 and communicates with a steam chamber 14. Thus, communication is established for the flow of steam through the inlet 13, steam chamber 14, and angled orifices 8 to the mixing chamber 1. A plurality of such orifices, two of which are illustrated in FIG. 3, may be provided in the plate 5, and an efficient system is to dispose the orifices approximately 90° apart around the orifice plate 5. The leftward extremity 15 of the conduit 10 is adapted to receive a flow of the slurry to be mixed and cooked in the chamber 1. The described system provides for thorough agitation and shear of the slurry under the influence of the steam issuing from the orifice plates. In conventional operation, a flow of 20 gallons per minute through the mixing chamber 1, depending upon unit size, is quite feasible.

Figure 1:
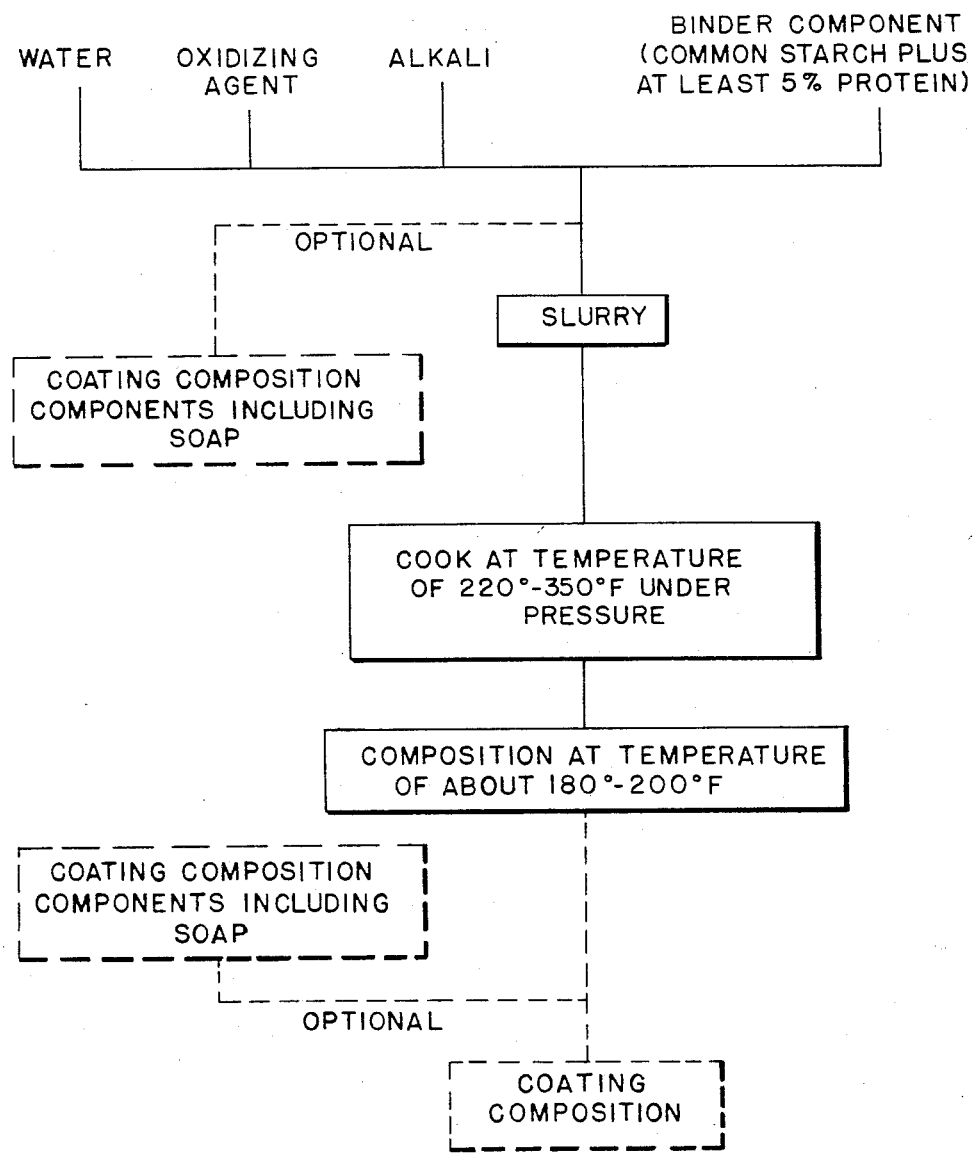
FIG. 1 is a flow chart illustrating a preferred embodiment of the method of invention including optional steps for addition of coating composition components.
Figure 2:
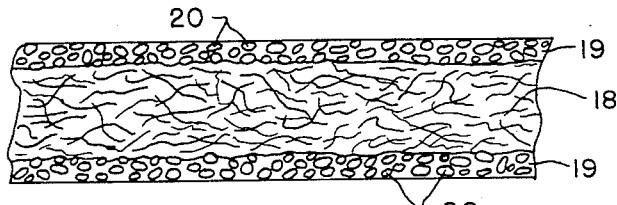
FIG. 2 is a fragmentary view in cross-section of a coated product produced in accordance with the invention.
Figure 4:
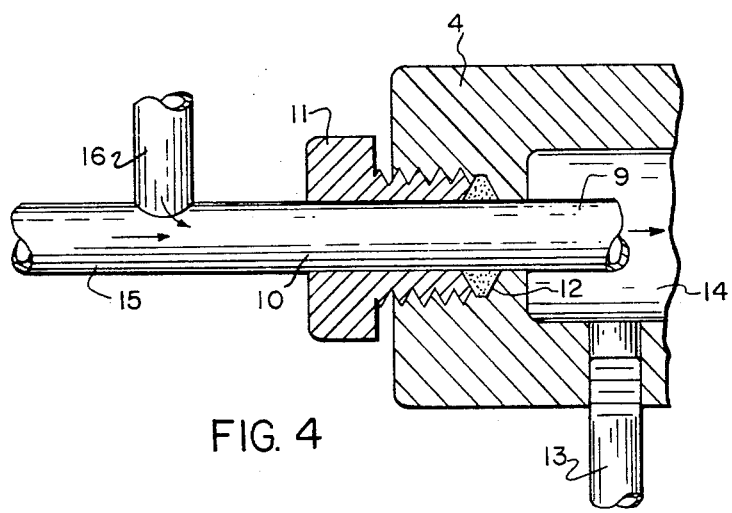
FIG. 4 is a fragmentary view of a modified form of apparatus illustrated in FIG. 3 and particularly adapted for cooking of a coating composition with oil inclusion.

In broad aspect the compositions formulated as in FIGS. 1 and 2 are fed to the conduit 10 through the inlet extremity 15 to the chamber 1. Simultaneously, the steam entering the inlet 13 and directed toward the axis of the chamber 1 causes material agitation of the slurry, swelling and granular rupture of the starch, as well as swelling of the protein, and exposes these latter components to the action of the oxidizing agent in the slurry. The cooked and modified material presses continuously from the outlet 2 to a receiving tank and is either in the form of an adhesive composition or as a complete paper coating composition. As indicated in FIGS. 1 and 2, the addition of components either before the cooking or after the cooking to provide a paper coating composition is optional. However, such latter formulations are pertinent to the invention, since they result in materially improved coating compositions. Particularly is this so when one of the added components is oil to produce an emulsion. The oil itself may be added to the slurry flowing through the conduit 10 via inlet 16 as indicated in FIG. 4, if so desired. Generally, however, the oil is added to the hot composition which emanates from the chamber 1 as less vapor losses result.

Figure 5:
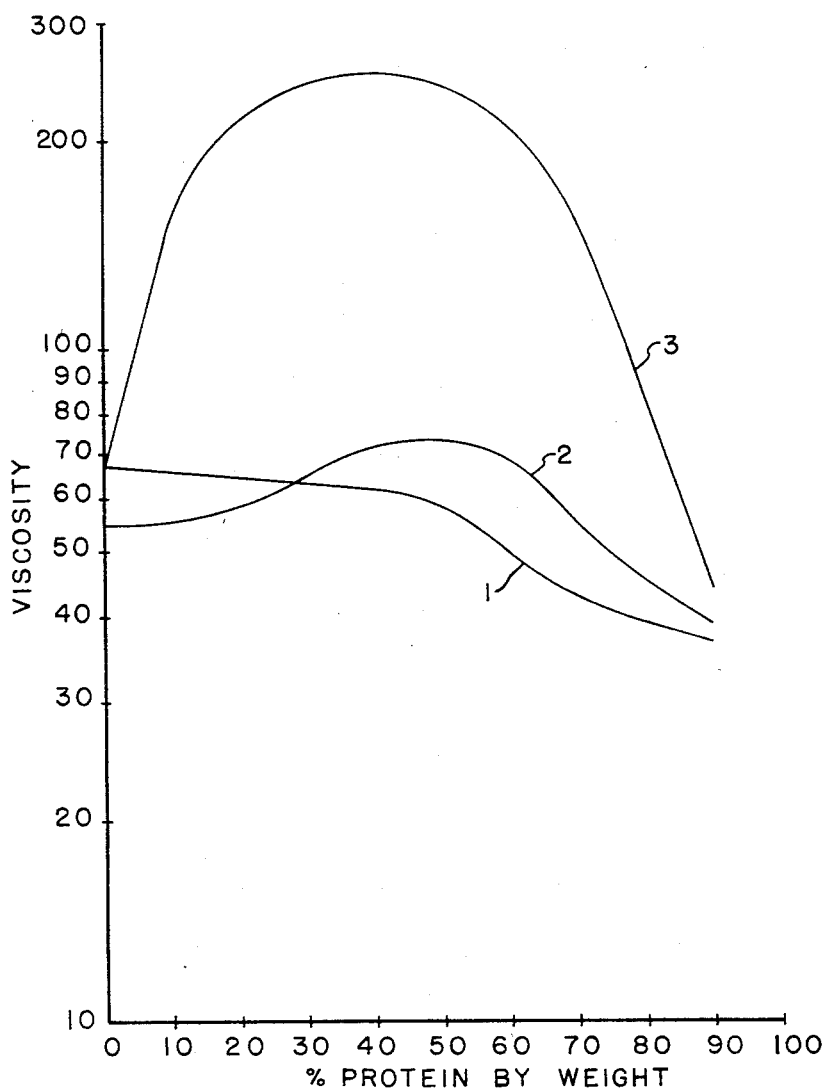
FIG. 5 is a graph illustrating the viscosity relationship of compositions of starch-protein cooked and oxidized in accordance with the present invention as contrasted with conventional methods.

In FIG. 5 the viscosities of starch-protein dispersions produced in accordance with this invention (curve designated 3) are compared with the viscosities of starch-protein dispersions in which (a) the common starch and protein are each cooked and modified separately with ammonium persulfate, and (b) a commercially modified starch and protein (delta low viscosity) are cooked separately.

The data for curve 3 were obtained by cooking and oxidizing the common starch-protein dispersions at 260° F. in an alkaline aqueous solution containing 1% of ammonium persulfate based on the weight of the starch-protein and 1% soap based on the starch weight. For the data of curve 1 the starch and protein were cooked and modified separately in alkaline solution at 260° F. in the jet cooker with ammonium persulfate present again to the extent of 1% on the weight of the component and, in the case of starch, with 1% soap on the starch weight. The data for curve 2 were obtained by cooking protein at 60° C. in alkaline solution and separately cooking the commercially modified starch for 15 minutes at 90° C.

The comparison is made at 12% solids at about pH 9 at a temperature of 50° C., the viscosities being in centipoises as measured with a Brookfield viscometer at 100 r.p.m. and an appropriate spindle (No. 1 or No. 2), and over the range from about zero percent protein to 90% protein. As will be noted, the viscosities of the compositions (semi-log scale) indicated in subparagraphs (a) and (b) above, and designated as curves 1 and 2 respectively, are materially lower throughout the protein range when protein is present even in very slight amount. Further, between about 5% and 10% protein (curve 3), in which the protein serves most beneficially in the production of adhesives for letterpress printing paper, the viscosity differences are very considerable. The sharp rise in curve 3, I consider, is a result of the starch-protein interaction. As the protein content increases beyond about 50%, the viscosity decreases due to the reduced starch quantity in the system. However, it is to be noted that, as the starch content decreases to about 50%, the viscosity continues to rise. While high protein contents, 70–85%, as evidenced by the curve designated 3, give corresponding viscosities to the 5–10% protein, the former range is much more expensive for coating compositions and will not provide the desired adhesive strength for letterpress printing paper. In most paper coating composition usages it is desirable to have the protein content below about 50% and below about 10% for letterpress printing paper.

The following specific examples illustrate the novel procedures in greater detail. The experimental results are indicated in the accompanying table. In each instance the coating formulation is applied to a 28-pound basis weight (25" x 38" x 500 sheets) publication grade base paper by means of a blade coater unless otherwise indicated. Such base paper contains about 40% bleached sulfite pulp by weight and 60% bleached ground wood (dry basis). In each instance the coating compositions applied to the web were dried in a blast of hot air and then lightly supercalendered. The final cooled product is illustrated in FIG. 2 wherein the numeral 18 designates the paper web, 19 a coating on each side of the paper, and 20 indicates the cells formed by evolution of the oil during drying.

EXAMPLE 1

This example illustrates the preparation of an aqueous common starch-protein adhesive and a coating composition incorporating the adhesive. The slurry prepared for cooking in the apparatus such as that of FIG. 3 was as follows:

| | Parts by weight |
|---|---|
| Water | 2700 |
| Sodium carbonate | 16 |
| Starch, pearl corn (10% moisture) | 1080 |
| Protein, soya (7% moisture) | 120 |
| Ammonium persulfate | 9 |

The above composition was cooked at a temperature of approximately 260° F. and the composition was flowed through the cooking apparatus at a rate of approximately ½ gallon per minute. This composition, with 10 parts of soap added and if reduced to about 12% solids by the addition of water, is suitable for use as a size in paper treatment and provides in the usage reduced water penetration as compared to starch sizes as usually prepared. In the present instance, however, a complete coating composition was formulated as follows. As the composition issued from the cooking and oxidizing chamber to a suitable mixing tank (not shown) some water was lost as steam in flash-off, but since condensate is added in the steam cooker, the cooked, oxidized composition is only slightly diluted. The composition appears as a readily flowable mass. To the composition there is then added while agitating about 7 parts of a 50% aqueous solution of NaOH, 1200 parts by weight of clay and about 10 parts by weight of sodium stearate. After blending in of this pigment, soap and alkali, the temperature of the coating composition is still quite high, approximately 200° F. About 1782 parts by weight of oil (S.G. 0.78) and then blended into the composition. Additionally, water is added in sufficient amount to provide a viscosity of 7,000 centipoises and a solids content of 28.5%. Such additions cool the composition to about 150° F. This entire mixture is then treated in suitable emulsifying equipment (while at about 150° F.) to thoroughly disperse the oil in the aqueous phase as very small droplets having a diameter on the average of between about 0.5 and 3 microns. The emulsification is effected easily and should be continued until at least about 95% of the droplets are within the stated range as such leads to good optical properties in the dried coating composition on the paper web.

The coating composition is permitted to cool to approximately 140° F. and is then applied to the web by a laboratory blade coater. The coating is quickly dried by directing a blast of high temperature air at about 300° F. directly to the coated surface of the sheet. The coating dries in less than about 1 second. The second side of the sheet may then be similarly coated and dried. The coated web is then lightly supercalendered. Data indicating the characteristics of such web coated one side are shown in Table I.

EXAMPLE 2

This example illustrates a coating composition having components similar to that of Example 1 but prepared on papermill equipment and coated on to the paper web in an experimental mill run. The composition fed to the cooker unit contained the following.

| | Parts by weight |
|---|---|
| Water | 270 |
| Sodium hydroxide | 1.28 |
| Clay (papermaker's coating clay) | 135 |
| Starch, pearl corn (10% moisture) | 121 |
| Protein, soya (7% moisture) | 14 |
| Ammonium persulfate | 0.50 |
| Soap (sodium stearate) | 1.25 |

The above composition was cooked at about 260° F. and issued from the cooker at a rate of about 5 gallons per minute. 170 parts by weight of oil (Stoddard solvent) and 150 pounds of water were added to the hot composition (temperature about 170° F.), the oil being blended in by means of vigorous agitation. The composition, while still hot (150° F.), was treated in a Kady mill to improve emulsification. The resulting composition had a viscosity of 70 poises at 50° C. as measured on a Brookfield viscometer with a No. 6 spindle at 100 r.p.m. The composition was applied to one side of a 28-pound web, dried, then applied to the second side and dried. The application was made with a Champflex coater, that is, a reversely rotating small diameter rod to remove applied excess coating. The coated web was then dried in a blast of hot air (300° F.) and lightly supercalendered on a production supercalender. The characteristics of the supercalendered web for the two side coating application are shown in Table I.

EXAMPLE 3

The present example, which is divided into two parts, illustrates the effect of differing quantities of protein at substantially the same binder level with all other components remaining the same. A composition having the following components was prepared and passed through a laboratory jet cooker.

| | Parts by Weight | |
|---|---|---|
| | Comp. A | Comp. B |
| Clay (KCS—Georgia Kaolin—papermaker's coating) | 1,200 | 1,200 |
| Starch (pearl corn, 10% water) | 1,080 | 1,140 |
| Protein (delta low viscosity soya) | 120 | 60 |
| Sodium hydroxide, 50% solution | 30 | 25 |
| Soap (sodium stearate) | 10 | 10 |
| Ammonium persulfate | 9 | 9 |
| Water | 2,700 | 2,700 |

In the first of the above compositions the protein forms 10% of the total binder while, in Composition B, the protein is about 5% of the total binder. Each of the compositions was passed through a jet cooker at a temperature of about 260° F. Oil and water were then added. The oil was added first to the compositions while at a temperature of about 180°–200° F., and the quantity of oil in each instance was about 1782 parts by weight (S.G. 0.78). This oil quantity is about 312 parts by weight for each 400 parts by weight of dry solids. In each instance the oil was blended in with vigorous agitation and water was added to achieve a viscosity of about 130 poises. The percent solids under such conditions of Composition A was 29.6 and the percent solids of Composition B, 31.6. The final pH was 9.1 for Composition A and 8.6 for Composition B. Each of the compositions was applied to a paper web of the nature previously described on a laboratory rod coater and the coatings were then dried in a blast of hot air having a temperature of about 300° F. The drying of the coatings is effected in less than 1 second. Each dried coated web was then lightly supercalendered. Table I indicates the characteristics of the coatings for coated one side paper and it will be noted therefrom that in each instance the letterpress pick and the half tone values, as well as the opacity and brightness, are quite satisfactory for letterpress printing papers.

While the comparison set forth has been made at a coat weight per side of 3½ pounds (dry basis), coat weights of less than 3 pounds are quite suitable. For example, a coat weight of 2.9 pounds using the 5% protein on the total binder weight exhibited a letterpress pick of 1, an opacity of about 88, and a brightness in excess of 69. If the quantity of protein is reduced below about 5%, then emulsion formation becomes more difficult and requires an excessive amount of power to accomplish the same degree of oil dispersion. Above about 10% protein the composition becomes more expensive without imparting to the finished coated web materially improved characteristics desired in letterpress printing and, accordingly, such extensive use of protein is not commercially warranted for this purpose.

EXAMPLE 4

This example illustrates the formulation of a complete coating by passage of all of the components through the cooker including the oil. The slurry, without the oil, had the following formulation.

| | Parts by weight |
|---|---|
| Clay (papermaker's coating) | 4800 |
| Calcium carbonate | 78.4 |
| Starch, pearl corn (10% water) | 4320 |
| Protein (delta low viscosity soya—7% water) | 480 |
| Sodium hydroxide, 50% aqueous solution | 12 |
| Soap (sodium stearate) | 43.2 |
| Ammonium persulfate | 39.2 |
| Ammonium hydroxide | 144 |
| Sodium hexametaphosphate | 9.6 |
| Water | 9300 |

Oil was pumped into this slurry through inlet 16, the oil being added in excess.

This oil-containing composition was cooked at a temperature of approximately 260° F. and, upon emanating from the cooker, was useful as a coating composition without further treatment of any kind. The emulsion which formed was not as fine as in emulsions formed in homogenizing equipment but was definitely useful. This complete coating composition had a pH of 8.1 and a percent solids of 29.8, and contained about 432 parts by weight of oil (S.G. 0.78) per 400 parts of solids. When applied to a paper web to the extent of about 3 pounds per side, dried in the hot air blast at a temperature of about 300° F. and then lightly supercalendered, the coated web had the characteristics indicated in Table I.

EXAMPLE 5

The following example illustrates the use of soya bean flour as the protein component. A composition was formulated as follows:

| | Parts by weight |
|---|---|
| Clay (papermaker's coating) | 1200 |
| Starch, pearl corn (10% water) | 1080 |
| Soya flour (about 7% moisture) | 240 |
| Ammonium hydroxide (50% aqueous solution) | 10 |
| Soap (sodium stearate) | 10 |
| Ammonium persulfate | 9 |
| Sodium hexametaphospate | 2.4 |
| Water | 2700 |

The composition was passed through the jet cooker, oil then added to the extent of 1,782 parts by weight, water added to provide 29.7% solids, while the composition was at a temperature of about 180° F. Coating composition was then applied to a web using a laboratory blade coater, dried in a blast of hot air (300° F.) and then lightly supercalendered on a laboratory calender. The complete composition as applied to the web had a viscosity of 85 poises and a pH of 9.3. The one-side coated web had the characteristics indicated in Table I.

EXAMPLE 6

The effect of the quantity of the oxidizing agent on ultimate viscosity is illustrated by the following comparative tests. The compositions were identical except that in Composition A the amount of oxidizing reagent was twice that of Composition B. The compositions were as follows.

| | Parts by Weight | |
|---|---|---|
| | Comp. A | Comp. B |
| Clay (papermaker's coating) | 1,200 | 1,200 |
| Starch, pearl corn (10% moisture) | 1,080 | 1,080 |
| Protein, delta low viscosity soya | 120 | 120 |
| Sodium hydroxide, 50% aqueous solution | 30 | 24 |
| Soap (sodium stearate) | 10 | 10 |
| Ammonium persulfate | 9 | 4.5 |
| Water | 2,700 | 3,300 |

The sodium hydroxide added was sufficient to provide a pH of about 9.1 after cooking. The cooking was effected at about 260° F. in each instance, the coating compositions emanating from the cooker, flashing to the atmosphere, the compositions then being at a temperature of about 210° to 212° F. 1,782 parts by weight of oil (S.G. 0.78) were added in each instance. In each instance water was added to an extent required to provide a good operable viscosity on the laboratory blade coater for each composition. The completed Composition A then, at a percent solids of 28, had a viscosity of about 43 poises while Composition B, at a percent solids of 28, had a viscosity of about 90 poises. Each of the compositions was applied to the usual paper web (one side) with a laboratory blade coater, dried in a blast of hot air and then lightly supercalendered. Composition B exhibited a considerably higher viscosity indicating quite completely the effect of a very small amount of the oxidizing agent. However, both coatings were quite satisfactory and the characteristics of the coated webs are set forth in Table I.

EXAMPLE 7

The following example illustrates the formation of a starch-protein reaction product and of a coating composition utilizing only a flour which contains both the starch and the protein. The composition was formulated as follows:

| | Parts by weight |
|---|---|
| Clay (papermaker's coating) | 1200 |
| Sorghum flour (90% starch and 10% protein by weight) | 1200 |
| Sodium hydroxide (50% aqueous solution) | 5.4 |
| Soap (sodium stearate) | 10 |
| Ammonium persulfate | 9 |
| Water | 2700 |

The above coating composition was cooked at a temperature of approximately 260° F. and emanated from the cooker. Oil was then added to the extent of about 1,782 parts by weight. Additionally, ammonia was added to provide the composition at a pH of 9.5, water was added to provide in the coating composition percent solids of 29.7 at a viscosity of 8,000 centipoises. The addition of the oil and water were made while the composition was hot (190° F.) and vigorous emulsification followed the oil and water addition. The coating composition was applied to a web in the usual manner, dried, lightly supercalendered as in the foregoing examples, and the coated paper characteristics for a one-side coated paper are as set forth in Table I.

EXAMPLE 8

The following composition is illustrative of a coating material wherein the binder is present in materially lesser proportion by weight to the pigment than in the aqueous emulsion type coating compositions previously described. The composition is useful for letterpress and rotogravure printing particularly, and is in general typical of paper coating compositions. The formulation is as follows:

| | Parts by weight |
|---|---|
| Clay (papermaker's coating) | 70 |
| Sodium hexametaphosphate | 0.2 |
| Calcium carbonate | 30 |
| Caustic | 0.50 |
| Starch, pearl corn (10% moisture) | 14.4 |
| Protein, soya | 1.6 |
| Calcium stearate | 0.14 |
| Ammonium persulfate | 9.0 |

Water sufficient to make 60% solids.
Viscosity, about 5,000 centipoises.

Such compositions are customarily employed on papers of somewhat greater basis weight than previously described, for example, a sheet having a basis weight uncoated (25" x 38" x 500 sheets) of about 55 pounds may have applied thereto about 12 pounds per side (dry basis) of the above noted coating composition. In effect, the starch-protein product is a pound-for-pound substitution for starch, usually modified starch, in the above-noted formulation. Data for a paper coated with a formulation as described above is set forth in Table I.

TABLE I.—COMPARATIVE TEST RESULTS

| | Example | | Ex. 3 | | Example | | Ex. 6 | | Example | |
|---|---|---|---|---|---|---|---|---|---|---|
| | 1 | 2 | A | B | 4 | 5 | A | B | 7 | 8 |
| Gloss, G. E. | 61.3 | 49.4 | 51.8 | 48.5 | 43.4 | 43.7 | 44.6 | 45.6 | 36.2 | 57.4 |
| Bright | 73.4 | 73.0 | 70.5 | 69.8 | 70.3 | 69.7 | 71.0 | 70.2 | 68.9 | 69.3 |
| Opacity | 90.8 | 90.8 | 90.0 | 89.0 | 87.8 | 88.5 | 89.3 | 87.7 | 87.6 | 91.2 |
| Half-tone test | 1.0 | 2.3 | 3.0 | 3.0 | 4.0 | 3.6 | 5.2 | 5.2 | 8.0 | 1.5 |
| L/P Pick | 2.0 | 1.0 | 1.7 | 1.3 | 2.0 | 1.7 | 1.7 | 2.7 | 2.0 | 1.0 |
| Roto. conv | 3.3 | 3.8 | 3.0 | 3.5 | 3.2 | 3.2 | 3.2 | 4.5 | 3.8 | |
| Dultgen | 3.0 | 4.0 | 2.7 | 3.0 | 3.0 | 3.5 | 3.0 | 3.5 | 3.5 | |
| Coat wgt. per one side | 4.8 | 3.0 | 3.5 | 3.5 | 3.0 | 3.4 | 2.5 | 2.4 | 2.0 | 12 |

In the foregoing description certain comparative tests have been employed to indicate the physical characteristics of the product. They are as follows: the gloss value is the percentage of specularly reflected light reflected at an angle equal to the angle of incidence employing a black glass as a standard, the angle of incidence being 75° and the area measured ¼" x ¾"; the higher the numerical value, the greater the gloss. Brightness is measured with a G.E. brightness tester common to the art; higher values indicate higher brightness. Opacity is measured with the standard Bausch and Lomb opacimeter, the larger values indicating greater opacity. Letterpress half-tone is a print test and is a measure of the paper's ability to reproduce 120 line screen with a 50% etch, the lower the numerical value the more suitable the paper for half tone printing, the range normally running from 1 to 10. The letterpress pick test is also a print test which involves printing of a solid band of ink on the sheet under controlled conditions; the magnitude of pick or rupture during printing is graded against standard prints to attain a numerical value, and the lower the numerical value, the more pick resistant is the sheet and the more suitable is the sheet for letterpress printing. Rotoprintability is an indication of surface levelness as pertains to rotogravure printing and the test involves actual printing of the sheets and comparison with standard prints, particularly for graininess in the print. The lower the numerical value, the more suitable is the print for rotogravure printing and the scale normally runs from 1 to 10.

The foregoing examples illustrate the utility of the starch-protein reaction product in coating compositions and a variety of ways in which such coating compositions may be formulated. It is not believed to be necessary to specifically set forth other examples of useful temperatures, common starches, proteins and flours. The effect of the high temperature, caustic and the oxidizing agent in combination is to reduce the degree of polymerization of both the starch and protein very quickly. This apparently minimizes molecular aggregates and, by control of the quantity of oxidizing agent introduced with relation to the temperature, the degree of polymerization is reduced sufficiently to eliminate to a desired extent the high solution viscosities contributed by excessive molecular size. The oxidizing agents, particularly at high temperatures, form the carbonyl groups on the starch while accomplishing the uniform reduction in viscosity of the common starch-protein slurry and while retaining acceptable levels of adhesive strength. The production of the carbonyl groups permits interaction with various groups of the protein, for example, amino groups.

In essence, it is considered that the oxidizing agent serves in the process to tend to reduce starch viscosity; however, even with a small amount of protein present and with the oxidizing agent capable of inducing carbonyl group formation on the starch molecules, a branch chain apparently results which restricts the reduction in viscosity. Such is beneficial as the product emanating from the cooker may then be further altered as to viscosity characteristics if so desired.

While I have described my invention, particularly in connection with a jet cooker of the type wherein steam is introduced into the slurry to effect cooking and agitation, such procedure is not necessary. The flowing dispersion may be cooked in any suitable heating means such as a steam jacketed cooker wherein the mixing is effected mechanically. In fact, any dispersion mixing and heating equipment, steam heated, electrically heated, or otherwise is suitable.

Also, while I have particularly referred to sodium stearate and calcium stearate as useful soaps, any surface-active agent capable of complexing with the amylose of the starch may be employed. Such other agents include stearates such as those of ammonium and potassium, the palmitates, myristates, petroleum base sulfonates, mono- and diglycerides, aryl alkyl sulfonates, alkyl sulfonates and the like. Such agents complex with amylose to inhibit gelation and, where non-gelling is desired, such a component is required when common starch is employed. The quantity of such surface-active agent should be sufficient to achieve a nongelling condition with the particular starch employed.

A plurality of advantages in the paper coating field result from the described procedures: viscosity is readily controlled; water holdout on application to a web is improved and the coating itself is well up on the web surface; economy of production is attained and the coated paper products are of a desired nature, for the coating compositions thus achieved permit the production of very light weight printing papers. Light weight papers which are well adapted to printing are highly desirable in the book and publication fields. It is further to be noted that the production of the light weight paper utilizing the described coating compositions is achieved without material loss of bulk and that supercalendering, while it decreases the bulk to some extent, is only a light application sufficient to assure a relatively smooth surface and does not deleteriously affect bulk properties.

The light basis weight coated printing paper, due to the evolution of the oil which follows the evolution of water from the coating composition on the web, is provided with a multiplicity of pores or voids which materially contribute to the opacity of the sheet even with light coating weights. This, as is known, is due to the air-coating interfaces. It is believed that, at these interfaces, the high binder content commonly contributes to a slight degree of tackiness in coated papers prepared from an emulsion system. It is quite unexpected that the starch-protein complex would improve this characteristic.

In addition to the specific usages set out hereinbefore, the starch-protein product has utility in varied fields. For these purposes the relatively high viscosity materials emanating from the cooker may be diluted with water if desired. Such capabilities include usage in foodstuffs as stabilizers, i.e., chocolate milk; or in oil drilling muds. It is my belief that I have discovered a new starch-protein product and I intend to claim the same broadly as well as in the more specific aspect of the coating composition area.

It will be understood that this invention is susceptible to modification in order to adapt to different usages and conditions and, accordingly, it is desired to comprehend such modifications within the invention as may fall within the scope of the appended claims.

What is claimed is:

1. In a process in which common starch in an aqueous alkaline slurry containing a water-soluble oxidizing agent capable of oxidizing starch alcohol groups to carbonyl groups is flowed through a heating and mixing zone and heated rapidly above the gelatinization range of the starch under pressure with steam to a temperature in the range of about 220° F. to 350° F. to oxidize, swell, rupture and cook the starch to provide an aqueous dispersion, the steps of introducing into the aqueous alkaline slurry with the common starch and before heating the slurry, alkaline soluble protein material to the extent of between about 5% to 85% by weight of the total weight of starch and protein present to subject the alkaline soluble protein also to the oxidizing agent to substantially completely exhaust the oxidizing agent and to cause the protein to interact with the starch and achieve a grafting of protein and starch molecules.

2. In a process according to claim 1 the step of introducing to the aqueous alkaline slurry about 0.1% to 5% by weight based on the weight of starch and protein an oxidizing agent selected from the group consisting of persulfuric acid and water-soluble persulfates and as the protein material a protein selected from the group consisting of soy protein and casein and to the extent of between about 5% to 10% of the total weight of starch and protein present.

3. A process according to claim 1 and which includes providing the starch with the protein material to the aqueous slurry as a single component in the form of a flour.

4. In a process according to claim 1 and to provide the dispersion for use as a binder in paper coating compositions, the steps of introducing the protein material to the extent of between about 5% to 10% by weight of the total weight of common starch and protein material, adding to the aqueous slurry prior to the heating thereof sufficient water soluble alkali to offset acidic products of hydrolysis of the proteinaceous material, and also adding, at any time before the dispersion is cooled to the gelation range, an agent which forms a complex with amylose of starch to inhibit gelling of the dispersion, said agent being added to the extent of between about 0.75% to 1.25% based on the dry weight of the starch and protein material.

5. In a process according to claim 4 and to provide the dispersion for use in emulsion coating compositions, the step of emulsifying into the composition an oil having a vapor pressure which is less than that of water by adding such oil at any time prior to cooling of the composition below about 180° F. and dispersing the oil with agitation into the form of small droplets having a diameter of between about 0.5 and 3 microns.

6. A fluid composition comprising an aqueous alkaline dispersion having a pH in the range of about 8 to 10 containing the alkaline catalyzed reaction product at a temperature in excess of the gelatinization range of common starch of:
   (a) common starch,
   (b) protein to the extent of between about 5% and 85% by weight based on the total weight of starch and protein,
   (c) a water-soluble oxidizing agent capable of oxidizing starch alcohol groups to carbonyl groups, and said composition including a complex formed between amylose of the starch and a starch gelation inhibiting agent whereby gelation of the composition is inhibited.

7. A fluid composition according to claim 6 for use as a paper coating emulsion and wherein the composition contains oil and paper coating pigment, said oil having a vapor pressure which is less than that of water and being emulsified in the composition in the form of small droplets having a diameter of between about 0.5 and 3 microns, the starch gelation inhibiting agent being present to the extent of between about 0.75% and 1.25% by weight and the protein being present to the extent of about 5 to 10% by weight based on the total of starch and protein weights.

8. A fluid composition according to claim 6 for use as a binder in paper coating compositions wherein: the protein is present to the extent of 5 to 10% by weight of the weight total of starch and protein, said water soluble oxidizing agent is selected from the group consisting of persulfuric acid and water soluble persulfates, the starch gelation inhibiting agent is soap present to the extent of between about 0.75% and 1.25% by weight based on the dry binder weight, and said composition contains oil and paper coating pigment, said oil having a vapor pressure which is less than that of water and being emulsified in the composition in the form of small droplets having a diameter of between about 0.5 and 3 microns, the composition having a solids content in the range of about 25 to 45% by weight and the weight of oil present being at least equal to the weight of the paper coating pigment.

9. A paper product having a dried printable coating thereon and which coating exhibits a multiplicity of cells contributing to the opacity of the coated paper, said coating being characterized by good pick resistance and improved resistance to tackiness, said coating being the dried residue of a composition as claimed in claim 7.

10. A paper product as claimed in claim 9 and in which each side of the web has a coating which is the dried residue of a composition as claimed in claim 7.

11. The alkali catalyzed reaction product of starch and protein in swollen and molecularly dispersed form in an aqueous alkaline dispersion at a temperature in the range of about 220°–350° F. in the presence of a water-soluble persulfate oxidizing agent and an agent which forms a channel complex with amylose of the starch, the said protein being present to the extent of between about 5–85% by weight of the total weight of the starch and protein present.

References Cited

UNITED STATES PATENTS

| | | | |
|---|---|---|---|
| 1,391,065 | 9/1921 | Lenders. | |
| 3,372,050 | 2/1966 | Weber. | |
| 2,400,402 | 5/1946 | Evans. | |
| 2,059,343 | 11/1936 | Hadfield | 117—156 |
| 2,360,828 | 10/1944 | Craig | 106—157 |
| 2,776,226 | 1/1957 | Hart | 117—165 |
| 2,900,268 | 8/1959 | Rankin et al. | 106—150 |
| 2,961,334 | 11/1960 | Clancy et al. | 117—156 |
| 3,108,009 | 10/1963 | Clancy et al. | 117—156 |
| 3,211,564 | 10/1965 | Lauterbach | 106—214 |

JULIUS FROME, *Primary Examiner.*

T. MORRIS, *Assistant Examiner.*